United States Patent [19]

Ogata

[11] 4,400,039
[45] Aug. 23, 1983

[54] ELECTRO-HYDRAULIC BRAKE SYSTEM HAVING ELECTRIC CONTROL MEANS

[75] Inventor: Yasuhiro Ogata, Hirakata, Japan

[73] Assignee: Kabushiki Kaisha Komatsu Seisakusho, Tokyo, Japan

[21] Appl. No.: 244,787

[22] Filed: Mar. 17, 1981

[30] Foreign Application Priority Data

Mar. 27, 1980 [JP] Japan ................... 55-38161

[51] Int. Cl.³ .................................... B60T 13/22
[52] U.S. Cl. ................................ 303/3; 188/16; 192/4 R; 303/6 A; 303/15; 303/71
[58] Field of Search ............... 303/71, 6 M, 9, 2-4, 303/10, 6 A, 6 R, 6 C, 13, 15–17, 7; 188/170, 16, 354; 192/12 R, 4 R, 91 A, 11, 13 R, 12 C

[56] References Cited

U.S. PATENT DOCUMENTS

| | | | |
|---|---|---|---|
| 3,463,276 | 8/1969 | Brooks, Jr. | 303/9 X |
| 3,488,096 | 1/1970 | Hoopes | 303/9 |
| 3,507,542 | 4/1970 | Cannella | 303/15 X |
| 3,834,769 | 9/1974 | Just | 188/16 X |
| 3,951,464 | 4/1976 | Donahue et al. | 303/13 X |
| 4,336,869 | 6/1982 | Tsutsumi | 192/13 R |
| 4,339,154 | 7/1982 | Duttarer et al. | 303/71 X |

*Primary Examiner*—Douglas C. Butler
*Attorney, Agent, or Firm*—Armstrong, Nikaido, Marmelstein & Kubovcik

[57] ABSTRACT

A brake system for a vehicle having a pair of brakes each being spring-applied and hydraulically released. A two-position brake valve is disposed between a source of fluid and the brakes. At normal position, the brake valve allows to connect the brakes to a tank thereby applying the brakes while at an offset position fluid is introduced into the brakes so as to release them.

The brake valve is operated either by an electric actuator such as stepping cylinder or introducing fluid into a pilot port through a solenoid-operated valve. The electric actuator is operated in accordance with a signal from a potentiometer which in turn is operated by the movement of a brake pedal. The solenoid-operated valve is actuated by a signal from a switch which is adapted to be switched on by a brake lever for parking and emergency braking.

5 Claims, 1 Drawing Figure

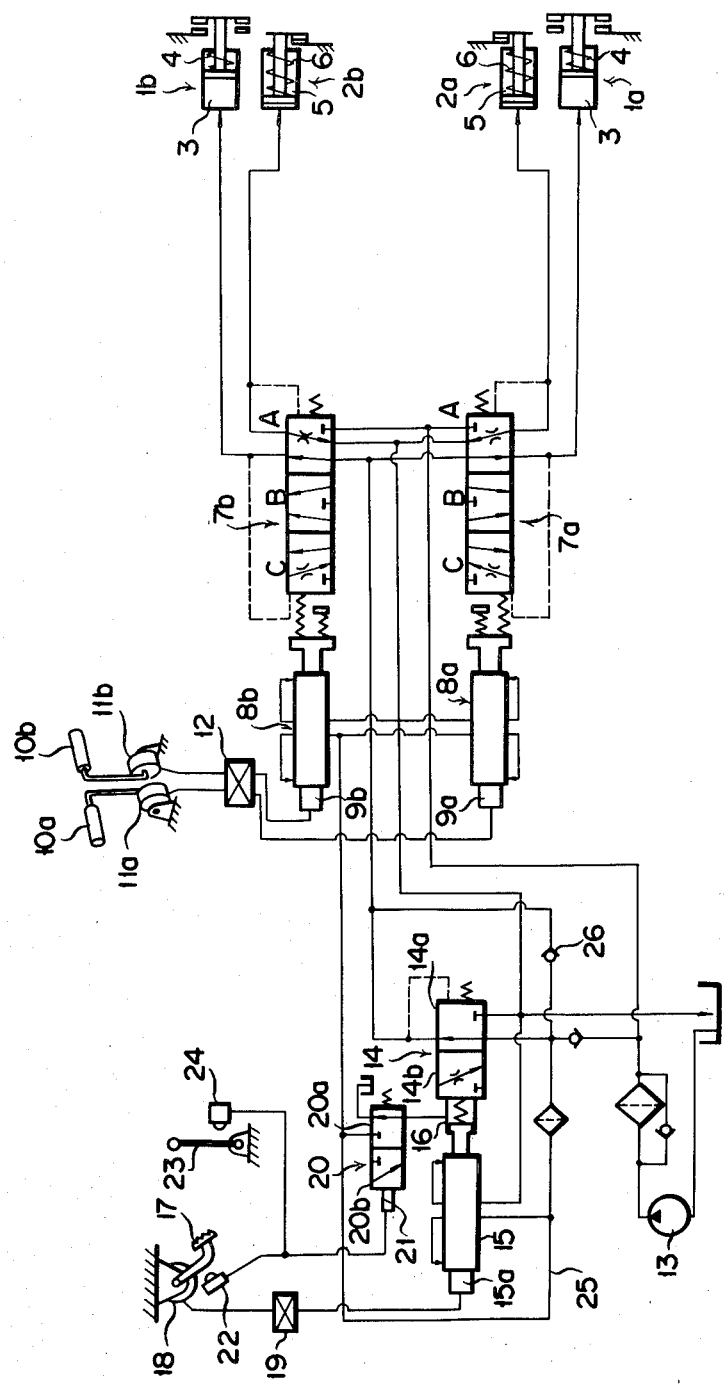

ELECTRO-HYDRAULIC BRAKE SYSTEM HAVING ELECTRIC CONTROL MEANS

BACKGROUND OF THE INVENTION

This invention relates to a brake system for use in track type construction vehicles such as bulldozers or the like.

In conventional construction vehicles of this kind, all the controls including the control of brake gears have been made through linkages or conduit systems. Therefore, there has been a problem in that it takes much time to attach and detach such linkages or conduit systems when overhauling, reassembly, maintenance and inspection of vehicles are made. Further, in most cases, a single control system is commonly employed for the main brake and emergency brake so that, if the control system got out of order, the operator will encounter a difficulty that the brake gear cannot be actuated.

SUMMARY OF THE INVENTION

It is therefore an object of the present invention to provide an improved brake system for a vehicle which overcomes the above noted problems.

Another object of the present invention is to provide a brake system for a vehicle wherein electric control means are provided for actuating main service brakes and parking and emergency brakes which contributes to an easy assembling and disassembling of component parts as well as maintenance thereof.

A further object of the present invention is to provide a brake system for a vehicle wherein control system for the main service brake is separated from that of parking and emergency brakes thereby enhancing reliability of brake control systems.

A still further object of the present invention is to provide a control system for a vehicle wherein the parking and emergency brakes can be applied not only by a brake lever but also by the stroke end of a brake pedal for the main service brakes thus assuring the brakes to be applied even in the case of failure in the control system of the main service brakes.

In accordance with an aspect of the present invention, there is provided a brake system for a vehicle, comprising: a pair of brake means, each being spring-applied and hydraulically released; a source of fluid under pressure; a brake valve connected with said source of fluid and said brake means, said brake valve having formed therein a communication position where fluid under pressure is supplied to said brake means to release the same and an offset position where fluid in said brake means is drained to a tank to have said brake means spring-applied, said brake valve also having an actuating section thereof formed therein and being normally held in the communication position; first electric actuator means connected with the actuating section of said brake valve for shifting the same to the offset position when actuated; a brake pedal; first sensor means for sensing the movement of said brake pedal and generating a first signal therefrom; first controller means for actuating and controlling said first electric actuator means in accordance with the first signal received from said first sensor means; a solenoid-operated auxiliary brake valve operatively connected with the actuating section of said brake valve and said source of fluid, said auxiliary brake valve having formed therein a drain position where the actuating section of said brake valve is connected to the tank and an offset operating position where fluid under pressure is introduced therethrough to the actuating section of said brake valve for shifting the same; a brake lever for parking and emergency braking; and a first switch adapted to be switched on by the operation of said brake lever, said first switch being connected with said auxiliary brake valve for changing over the same to the offset position when it is switched on thereby shifting said brake valve to the offset position and applying said brake means.

The above and other objects, features and advantages of the present invention will be readily apparent from the following description taken in conjunction with the accompanying drawings.

BRIEF DESCRIPTION OF THE DRAWING

The accompanying drawing is an overall brake control system for a vehicle according to the present invention.

DESCRIPTION OF THE PREFERRED EMBODIMENT

The present invention will now be described below by way of example only with reference to the accompanying drawing.

In the drawing, reference numeral $1a$ and $1b$ denote left and right hand side brakes, and $2a$ and $2b$ left and right hand side clutches, in which the left and right hand side brakes as well as clutches have the same construction. The brakes $1a$ and $1b$ are each adapted to release its braking force when its brake cylinder 3 is supplied with hydraulic fluid and to apply its braking force by the resilient force of a spring 4 when the supply of hydraulic fluid is cut off. Whilst, the clutches $2a$ and $2b$ are each adapted to be disengaged when its clutch cylinder 5 is supplied with hydraulic fluid and to be engaged by the resilient force of a spring 6 when the supply of hydraulic fluid is cut off. Reference numerals $7a$ and $7b$ denote left and right hand side steering control valves which have the same construction and each of which has a running position A where the brake is rendered off and the clutch is rendered on, a floating position B where both the brake and clutch are rendered off, and a braking position C where the brake is rendered on and the clutch is rendered off. Reference numerals $8a$ and $8b$ indicate stepping cylinders adapted to control the steering control valves $7a$ and $7b$, respectively, the stepping cylinders being arranged to be actuated by pulse motors $9a$ and $9b$, respectively. The pulse motors $9a$ and $9b$ are adapted to be controlled through a controller 12 by potentiometers $11a$ and $11b$ arranged to be actuated by left and right hand side steering levers $10a$ and $10b$, respectively. Reference numeral 13 denotes a hydraulic pump which serves as a pressurized fluid supply source.

Reference numeral 14 indicates a brake valve which has a brake-off position $14a$ where fluid under pressure is supplied to the brakes $1a$ and $1b$ and a brake-on position where the fluid under pressure within the brakes $1a$ and $1b$ is drained into a tank. The brake valve 14 has an actuating section 16 which is connected to a stepping cylinder 15 adapted to be actuated by a pulse motor $15a$. The pulse motor $15a$ of the stepping cylinder 15 is connected through a controller 19 with a potentiometer 18 arranged to be controlled by an ordinary service brake pedal 17. The actuating section 16 is also connected through an auxiliary brake valve 20 with the pressurized fluid supply source. The auxiliary brake valve 20 has a drain position 20a and an operating position 20b and is arranged to be actuated by a solenoid 21. The solenoid 21 is connected with an auxiliary switch 22 adapted to be rendered on when the ordinary service brake pedal 17 reaches its stroke end and with a switch 24 adapted to be rendered on by an operating lever 23 for parking brake and emergency brake.

Further, a circuit 25 which is on the side of the pressurized fluid supply source of the auxiliary brake valve 20 is connected through a check valve 26 with the brake cylinders 3, 3.

In the above-mentioned arrangement, by operating the left and right hand side steering levers 10a, 10b, the pulse motors 9a and 9b are actuated in proportion to the turning angles of the steering levers 10a and 10b, respectively, thereby to activate the stepping cylinders 8a and 8b so that the left and right hand side steering control valves 7a and 7b may be changed over to respective predetermined positions to effect steering of the vehicle. Stating in brief, by positioning the left hand side steering control valve 7a at the running position A and the right hand side steering control valve 7b at the floating position B, the vehicle can be turned slowly to the right and by positioning the valve 7a at the running position A and the valve 7b at the braking position C, the vehicle can be turned quickly to the right.

When the ordinary service brake pedal 17 is depressed, the stepping cylinder 15 is actuated in proportion to the stroke of the pedal 17 so that the brake valve 14 can be held at its brake-on position 14a thereby to drain the fluid under pressure within the brake cylinders 3, 3 into the tank so as to render the brakes 1a and 1b operative by the resilient force of the springs 4, 4. At that time, the steering control valves 7a and 7b are held at their running position A.

Next, if and when a brake operating lever 23 for parking and emergency braking is operated to render the switch 24 on, the auxiliary brake valve 20 will occupy its offset operating position 20b so that the fluid under pressure from the pressurized fluid supply source is supplied to the actuating position 16 of the brake valve 14 so as to allow the brake valve 14 to occupy its braking position 14b thereby actuating the brakes 1a and 1b in the similar manner as in the case of actuating the aforementioned ordinary service brake.

Further, when the aforementioned ordinary service brake pedal 17 is depressed to its stroke end, the auxiliary switch 22 is rendered on so as to allow the auxiliary brake valve 20 to occupy its offset operating position 20b thereby actuating the brakes 1a and 1b in the similar manner as in the case of actuating the aforementioned parking and emergency brakes.

In the usual case, the fluid under pressure to be supplied to the actuating section 16 of the brake valve 14 is supplied through the circuit 25 and the auxiliary brake valve 20 by the hydraulic pump 13. However, since the circuit 25 is connected through a check valve 26 with the brake cylinders 3 and 3, even when the hydraulic pump 13 is stopped due to engine stop etc., the pressurized fluid supply source for operating the auxiliary brake valve 20 can be secured.

Since the present invention is constructed as mentioned in detail hereinabove, following advantages can be obtained.

(1) The control system for the parking and emergency braking is an electrical arrangement so that overhauling, reassembly, maintenance and inspection of the vehicle can be made easily.

(2) The control system for the parking and emergency braking is provided separately from that of the ordinary service brake system so that the reliability in operation of the brake control system can be much improved.

(3) Even when the control system for the ordinary service brakes goes wrong during the operation of the ordinary service brakes a quick emergency operation can be achieved by depressing the brake pedal 17 to its stroke end.

It is to be understood that the foregoing description is merely illustrative of a preferred embodiment of the present invention, and that the scope of the invention is not to be limited thereto, but is to be determined by the scope of the appended claims.

What I claim is:

1. A brake system for a vehicle, comprising:
a pair of brake means, each being spring-applied and hydraulically released;
a source of fluid under pressure;
a brake valve connected with said source of fluid and said brake means, said brake valve having formed therein a communication position where fluid under pressure is supplied to said brake means to release the same and an offset position where fluid in said brake means is drained to a tank to have said brake means spring-applied, said brake valve also having an actuating section thereof formed therein and being normally held in the communication position;
first electric actuator means connected with the actuating section of said brake valve for shifting the same to the offset position when actuated;
a brake pedal;
first sensor means for sensing the movement of said brake pedal and generating a first signal therefrom;
first controller means for actuating and controlling said first electric actuator means in accordance with the first signal received from said first sensor means;
a solenoid-operated auxiliary brake valve operatively connected with the actuating section of said brake valve and said source of fluid, said auxiliary brake valve having formed therein a drain position where the actuating section of said brake valve is connected to the tank and an offset operating position where fluid under pressure is introduced therethrough to the actuating section of said brake valve for shifting the same;
a brake lever for parking and emergency braking; and
a first switch adapted to be switched on by the operation of said brake lever, said first switch being connected with said auxiliary brake valve for changing over the same to the offset position when it is switched on thereby shifting said brake valve to the offset position and applying said brake means.

2. A brake system for a vehicle as recited in claim 1 further comprising a second switch adapted to be switched on by said brake pedal when the same is operated near to its stroke end, said second switch being connected with said auxiliary brake valve for changing over the same to the offset position when it is switched on.

3. A brake system for a vehicle as recited in claim 1 or 2 wherein said auxiliary brake valve is connected with said brake means through a check valve which allows flow of fluid to pass therethrough in a direction from said brake means to said auxiliary brake valve but blocks the flow in the opposite direction.

4. A brake system for a vehicle as recited in claim 1 further comprising:
 a pair of steering control valves each being connected with said brake valve and said respective brake means and having formed therein a normal neutral position where said brake means is hydraulically released and first and second offset positions; and
 a pair of steering levers each of controlling said respective steering control valves.

5. A brake system for a vehicle as recited in claim 4 further comprising:
 a pair of second electric actuator means each operatively connected with said respective steering control valves;
 a pair of second sensor means each for sensing the movement of said respective steering levers and generating a second signal therefrom; and
 second controller means for actuating and controlling said second electric actuator means in accordance with the second signal received from said second sensor means.

* * * * *